United States Patent [19]
Pedersen

[11] 3,784,328
[45] Jan. 8, 1974

[54] POWER TRANSMISSION
[75] Inventor: Nicholas F. Pedersen, Farmington, Mich.
[73] Assignee: Sperry Rand Corporation, Troy, Mich.
[22] Filed: June 13, 1972
[21] Appl. No.: 262,398

[52] U.S. Cl. .............................................. 417/222
[51] Int. Cl. ............................................. F04b 1/26
[58] Field of Search .................... 417/213, 218, 221, 417/222; 91/505, 506

[56] References Cited
UNITED STATES PATENTS
3,563,675  2/1971  Straznickas ......................... 417/222
3,667,867  6/1972  Boydell et al ....................... 417/222
3,250,227  5/1966  Kouns ................................. 91/473

Primary Examiner—William L. Freeh
Assistant Examiner—Gregory P. La Pointe
Attorney—Theodore Van Meter

[57] ABSTRACT

A pressure regulated variable delivery hydraulic pump includes a control for varying the pump displacement which responds not only to outlet pressure of the pump, but also to the rate of change of pressure and to the rate of change of pump delivery. Regulation is by outlet pressure opposed by two springs in back-to-back relation with a dashpot intermediate the two springs which retards rapid movements of one spring in backing up the other. The dashpot action is further modified by a feedback responsive to the rate of change of pump displacement. The result is a servo-control system which has high gain characteristics for small transients and lower gain for large transients and an increased damping ratio with a reduction in overshoots of pressure transients.

8 Claims, 1 Drawing Figure

PATENTED JAN 8 1974  3,784,328
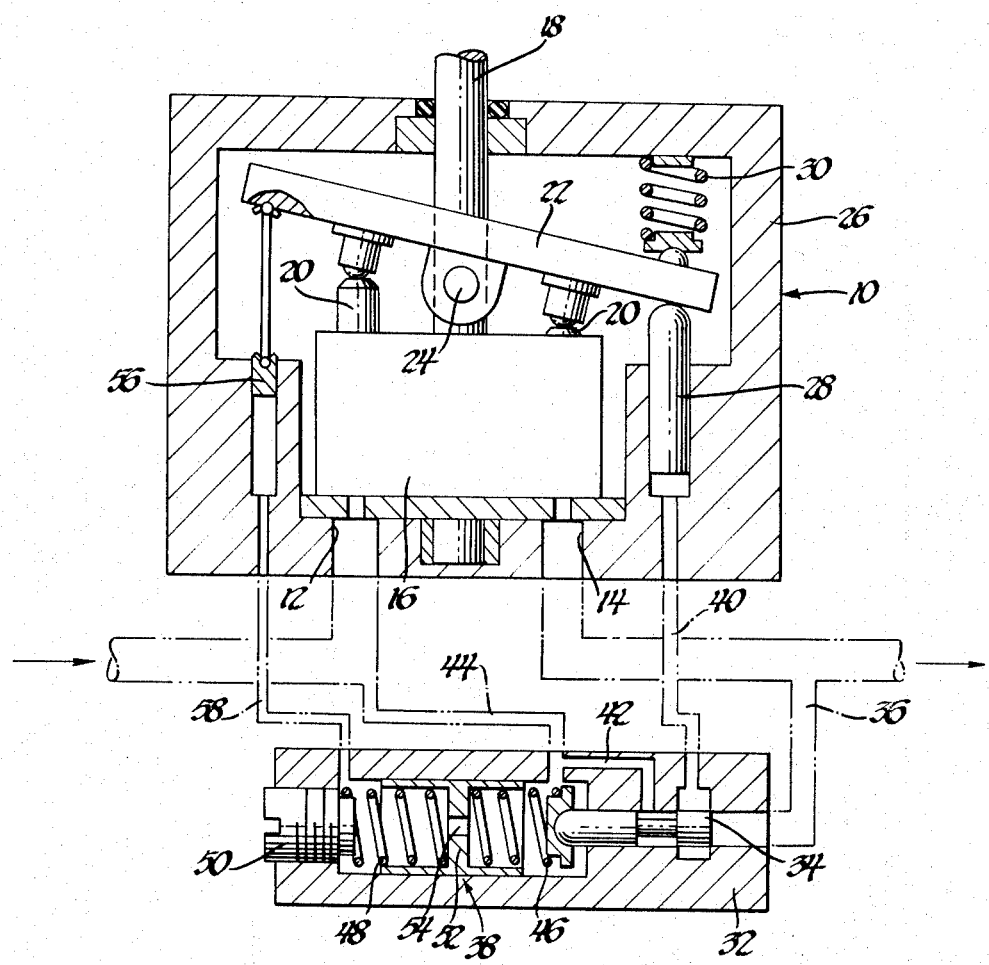

POWER TRANSMISSION

Modern central hydraulic power systems such as used on aircraft, for example, impose severe performance requirements upon the hydraulic pump which supplies pressure fluid to the system. It is customary to provide a variable displacement pump with a displacement regulating mechanism intended to maintain a constant pressure in the fluid delivery line from the pump. Due to the wide and rapid variation in volumetric requirements as one or another of the fluid utilizing devices in the system are turned on or off, the pressure transients at the pump are highly fluctuating. It is the function of the pump regulator to minimize such transients by quickly varying the pump delivery rate to correspond to each instantaneous change in volumetric demand by the system. Prior pump regulators, if designed for high gain and rapid response, have the drawback of the degree of stability being highly sensitive to the effective system volume. This sensitivity is often reduced by decreasing control gain and response resulting in large overshoots and pressure dips.

It is an object of the present invention to provide an improved variable displacement pump regulator in which the foregoing difficulties are minimized and in which a high sensitivity or gain is achieved and at the same time pressure overshoots and undershoots are reduced both in number and size.

These effects are achieved by the provision in a pressure regulated variable delivery pump which has an inlet and an outlet with expansible chamber means for pumping fluid therebetween together with a shiftable member connected with the expansible chamber means and effective to vary the volumetric pumping capacity and hydraulic regulating means responsive to outlet pressure for shifting the member, that improvement which comprises a multiple spring system opposing outlet pressure at the regulating means, including a first spring acting directly on the regulating means, a second spring backing up the first spring, and dashpot means intermediate the two springs effective to retard rapid movements of the second spring in backing up the first spring.

THE DRAWING is a diagrammatic representation of a variable delivery pump and pressure responsive control therefore incorporating a preferred form of the present invention.

In the drawing, the pump 10 is indicated as an axial piston type having an inlet 12 and an outlet 14 with a revolving cylinder barrel 16 driven by a shaft 18. Pistons 20 reciprocate in the cylinder barrel 16 as they revolve around on the swashplate 22 which is oscillatable on trunnions 24 in the stationary casing 26. The angular position of the swashplate 22 is adjusted by means of a hydraulic servopiston 28 and a biasing spring 30; thus the swash-plate 22 constitutes a member shiftable to vary the volumetric displacement of the pump 10. The foregoing description is merely illustrative of one of the many types of variable displacement hydraulic pumps well known to the art today.

For the purpose of regulating the displacement of the pump 10 to maintain a substantially constant pressure in the outlet 14, there is provided a pilot valve assembly 32 which senses small pressure changes in the outlet 14 which occur as the volumetric consumption of fluid by the system changes and directs fluid toward or away from servopiston 28. Thus, the pilot valve 32 includes a spool 34, the right-hand end of which is exposed to outlet pressure through a conduit 36. The left-hand end of the spool 34 is in contact with a multiple spring system generally designated 38, which biases the spool 34 to the right. The spool 34 constitutes a three-way valve which, in its neutral position, blocks all flow to or from the piston 28 through a conduit 40. When shifted to the left, spool 34 admits pressure fluid to conduit 40 from conduit 36 and when shifted to the right, it exhausts fluid from conduit 40 to the pump inlet through conduits 42 and 44. Thus, spool 34 constitutes a pilot valve for controlling the pistons 28 in accordance with changes in pressure in the outlet 14 and, except for the multiple spring and dashpot system hereafter described, is typical of many well known pressure responsive regulators for variable displacement pumps.

The multiple spring system 38 includes a first spring 46 which abuts directly against the spool 34 and a second spring 48 which serves as a back-up for the spring 46. A screw 50 serves as a means for adjusting the compression of the two springs 46 and 48 and thus changing the average pressure to which the spool 34 responds. Between the two springs 46 and 48, there is a floating piston 52 which slides in the chambers enclosing the two springs to displace fluid into one chamber and out of the other, or vice versa. A restricted orifice 54 permits limited communication between the two spring chambers, easily permitting slow movements of the piston and resisting more rapid movements. Thus, the piston 52, its restriction 54, and the two spring chambers constitute a dashpot which tends to dampen rapid changes in the position of the left end of spring 46; that is to say, of the backing up relationship of spring 48 to spring 46.

For the purpose of modifying the dashpot action of the piston 52 and restriction 54, the rate of change of the position of swashplate 22 is introduced into the multiple spring system by means of a feedback piston 56 which is connected to the left-hand spring chamber by a conduit 58. This further modifies or tends to inhibit rapid changes in the position of the left-hand end of spring 46 by injecting or withdrawing fluid into or out of the left-hand spring chamber in opposition to the otherwise normal motions of the piston 52 acting as a simple dashpot.

Preferably, the springs 46 and 48 have equal spring rates so that under steady state conditions, they constitute, in effect, a single spring having half the rate of either spring. Thus, for small or slow motions of the spool 34, the control system as a whole is extremely sensitive. That is to say, the regulator has a very high gain or at near steady state conditions. For larger excursions of the spool 34 induced by larger or more rapid pressure transients, the dashpot action of the piston 52 and the restriction 54 retard the motion of the left-hand end of spring 46 and thus increase the spring rate which is effective upon the left-hand end of spool 34. This produces a lowered gain of the servosystem as a whole during more major transients. In effect, the sensitivity of the regulator is high for small transients and is lower for larger transients.

In addition, the feedback piston 56 further modifies the back-up action of spring 48 upon spring 46 by introducing pressure changes in the left-hand spring chamber which are opposed to motions of the spool 34. These pressure changes are greatest when the velocity of the swashplate 22 is the greatest. Thus, a sort of anticipatory signal results which has the effect of reducing the subsequent overshoot of any pressure transient. The feedback from piston 56 acting upon the dashpot results in an increase in the damping ratio of the regulator as a whole. The feedback is, of course, a first derivative function of any pressure transient. The overall result of the variable gain and the derivative feedback is a pressure responsive control system which is stable in a larger range of system volume demands than is possible to achieve with conventional controls. This greatly reduces the pressure overshoots and undershoots which are normally associated with flow changes in the hydraulic systems of the type described.

I claim:

1. In a pressure regulated variable delivery pump having an inlet and an outlet, expansible chamber means for pumping fluid therebetween, a shiftable member connected with the expansible chamber means and effective to vary the volumetric pumping capacity, and hydraulic regulating means including a slidable fluid displacement device connected to outlet pressure for shifting the member, that improvement which comprises a multiple spring system opposing outlet pressure at the regulating means, including a first spring acting directly on the regulating means, a second spring backing up the first spring, a dashpot means intermediate the two springs effective to retard rapid movements of the second spring in backing up the first spring.

2. A pump as defined in claim 1 wherein the regulating means includes a servopiston and a pilot valve for selectively connecting the servopiston to either the inlet or the outlet.

3. A pump as defined in claim 1 wherein the dashpot means includes a first chamber surrounding the first spring and connected to the inlet, a second chamber surrounding the second spring, a floating piston separating the chambers and a restricted connection between the two chambers.

4. A pump as defined in claim 1 having a feedback means operated by the shiftable member and connected to the dash-pot means for modifying the backup action of the second spring on the first spring in accordance with the rate of movement of the shiftable member.

5. A pump as defined in claim 3 having a feedback means operated by the shiftable member including a piston connected to displace fluid into or out of the second chamber.

6. A pump as defined in claim 5 wherein the regulating means includes a servopiston and a pilot valve for selectively connecting the servopiston to either the inlet or the outlet.

7. A pump as defined in claim 1 wherein the first and second springs have equal force-displacement rates.

8. A pump as defined in claim 4 wherein the first and second springs have equal force-displacement rates.

* * * * *